United States Patent Office 3,629,218
Patented Dec. 21, 1971

3,629,218
PROCESS FOR THE PREPARATION OF POLYVINYL FLUORIDE HAVING LOW K-VALUES
Gerhard Bier, Troisdorf, Werner Trautvetter, Spich, and Gregor Weisgerber, Ittenbach, Germany, assignors to Dynamit Nobel Aktiengesellschaft, Troisdorf, Germany
No Drawing. Filed Mar. 24, 1969, Ser. No. 810,445
Claims priority, application Germany, Mar. 28, 1968, P 17 70 071.9
Int. Cl. C08f 3/22
U.S. Cl. 260—92.1                                 7 Claims

ABSTRACT OF THE DISCLOSURE

Process for the preparation of polyvinyl fluoride which comprises polymerizing vinyl fluoride in aqueous phase at a temperature above the critical temperature of vinyl fluoride, in the presence of a water soluble polymerization catalyst and 0.05 to 0.5 wt. percent of trans-1,2-dichloroethylene based on the vinyl fluoride.

---

This invention relates to an improved process for the preparation of polyvinyl fluoride. More particularly this invention relates to a process for preparing polyvinyl fluoride characterized by low K-values.

Polyvinyl fluoride (PVF) is characterized by its favorable stability with respect to ultraviolet rays and atmospheric influences and also because of its insensitivity to soil and a great variety of chemicals. Among other applications, polyvinyl fluoride can be used advantageously in the manufacture of sheets and also in the form of organosols for the annealing lacquering of metals, particularly where these materials are intended for open-air applications.

A disadvantage of polyvinyl fluoride lies in its frequently inadequate thermostability at elevated processing temperatures. This becomes noticeable in the form of a yellow coloration which sets in, in the manufacture of sheets using an extrusion process in the presence of a latent solvent or upon the annealing of dispersions of the polymer in a latent solvent onto metal articles. Another disadvantage, in particular of those vinyl fluoride polymerizates that have been prepared in aqueous phase above the critical temperature of VF in the presence of a water-soluble initiator, is a resultant K-value (according to Fikentscher) that is too high for most processing purposes.

It is already known in the art to lower the K-value of vinyl fluoride polymerizates by carrying out the polymerization at higher temperatures or by using chain regulators. The drawback of these known procedures is that in the polymerization of vinyl fluoride in the aqueous phase at temperatures above the critical temperature, in the presence of a known water-soluble polymerization initiator, the thermal form stability determined according to Vicat (Vicat number), and the thermal resistance are decreased. In addition, the regulators proposed for use in the vinyl fluoride polymerization process such as isopropanol or olefins, for instance, propylene, butylene and the like, as well as the other known regulators, such as acetone, chloroform, tetrahydrofuran, are associated with the disadvantage that the reaction velocity and the conversion are decreased to an intolerable extent at pressures below 200 atm. excess pressure.

It is also known to lower the K-value by the technique of increasing the concentration of the catalyst used in the polymerization. This mode of procedure, even though it does yield polymerizates having low K-values, has the disadvantage that the other properties of the polymerizate are impaired.

In accordance with the invention, it has now been found that the disadvantages of the art can be avoided and an improved polyvinyl fluoride obtained by polymerizing vinyl fluoride in aqueous phase at a temperature,[1] in the presence of a water-soluble polymerization catalyst and in the presence of 0.05 to 0.5 wt. percent of trans-1,2-dichloroethylene based on the vinyl fluoride present.

The use of dichloroethylene as a regulator is known, for instance in connection with the polymerization of vinylchloride. However, in the polymerization of vinyl chloride it is necessary to use very large amounts of the dichloroethylene in order to bring about a marked lowering of the K-value. This has been indicated in Table I which follows:

TABLE I

Vinyl chloride polymerization in aqueous phase ($H_2O$/VC=3) at 50° C. using 0.45% dilauroyl peroxide as initiator

| Dichloro ethylene (percent) | Reaction time (hrs.) | Conversion (percent) | K-value | Lowering of K-value |
|---|---|---|---|---|
|   | 18 | 90 | 75 | --- |
| 1 | 18 | 85 | 73 | 7 |
| 4 | 18 | 86 | 58 | 17 |
| 8 | 18 | 83 | 48 | 22 |

[2] When using azo-bisisobutyramidine-hydrochloride as a catalyst, it is of advantage to polymerize the vinyl fluoride at a temperature range between 60° C. and 100° C.

In the process according to the invention, in the polymerization of vinyl fluoride using dichloroethylene as a regulator, the K-value of the polymer is already considerably reduced upon the addition of 0.05% dichloroethylene. By varying the amount of the dichloroethylene introduced, it is possible in accordance with the invention to adjust any K-value between 40 and 80.

Instances of water-soluble catalysts which can be used in the polymerization include, for instance, azo-bis-isobutyramidine-hydrochloride and its N-alkyl substitution products or alkali metal salts of persulfuric acid.[2]

The following examples are given for the purpose of illustration. They are, however, not to be construed as limiting the scope of the invention.

EXAMPLE 1 (Reference example)

A stirrer autoclave manufactured of stainless steel (volume—2 liters) equipped with double jacketing for heating and cooling and an anchor-type stirrer was filled with 1300 cc. water that had first been desalinated in an ion exchanger. The autoclave was then closed and rinsed thoroughly three times with vinyl fluoride. 350 g. vinyl fluoride were pressed in under nitrogen from a heated pressure vessel. Thereafter the autoclave was heated to 75° C. and the stirrer regulated at a speed of 180 r.p.m. The pressure in the autoclave amounted to 200 kp./cm.² 0.52 g. azo-bis-isobutyramidine-hydrochloride (AIBA. HCl) in 50 ml. water were then pumped via a dosing pump into the autoclave. Rinsing was carried out by the pumping in of another 50 ml. water. The pressure was allowed to gradually drop while the temperature was maintained constant at 75° C. After a reaction time of 150 min. the pressure had dropped to 10–20 kp./cm.² The autoclave was then cooled and opened. The polyvinyl fluoride emulsion obtained was coagulated and centrifuged with a high speed stirrer (5000 r.p.m.) and centrifuged. The wet material (a water content of approximately 50%) was dried at 70° C., in the final stage under vacuum. The yield amounted to 315 g. (90%) K-value: 94, measured at 120° C. in a 1% solution in cyclohexanone.

[1] Range between the critical temperature of vinyl fluoride and 130° C.

EXAMPLES 2-6

The procedure described in Example 1 was repeated but using the amount of azo-bis-isobutyramidine-hydrochloride (AIBA.HCl) and of trans-dichloroethylene which are set out in Table II. Freshly distilled dichloroethylene was introduced into the aqueous phase prior to closing of the autoclave. The reaction times and percent conversions can be seen from Table II which follows. In Tables II and IIa the K-values of vinyl fluoride polymer products obtained with the use of dichloroethylene, in accordance with the invention, and also the lowering ($\Delta$ K.) of the K-value in comparison with vinyl fluoride polymer products prepared without dichloroethylene are set out. In Tables II and IIa there are further recited the values for thermal form stability, i.e., thermal non-deformability and specifically the Vicat number. The Vicat value was determined using PVF platelets compressed at 200° C. under a pressure of 20 kp./cm.$^2$. The Vicat number of the polyvinyl fluoride prepared according to the invention shows practically no change as compared to the PVF prepared without the addition of dichloroethylene so that the ratio of the Vicat number to the K-value (V/K) becomes more favorable. This is another advantage of the process according to the invention.

extrusion under the admixture of a latent solvent, does not occur. In Table III there is set out the evaluation of different samples prepared in mixture with a latent solvent (2 parts PVF and 1 part propylene carbonate) at a die temperature of 200° C. using a laboratory extruder (strands of a diameter of 5 mm.) in comparison with samples that were prepared in the absence of dichloroethylene.

TABLE III
Comparison of extruded samples of PVF produced using AIBA·HCl as a catalyst

| Sample | Appearance |
|---|---|
| PVF prepared without dichloroethylene | Markedly yellow. |
| PVF prepared with the addition of dichloroethylene (0.1%). | Practically colorless. |
| PVF prepared with the addition of dichloroethylene (0.2%). | Colorless. |

The visually discernible differences in color were established to correspond with the thermogravimetrically measured values. In Table IV, there are set forth the results of the thermogravimetric analysis of a polymer

TABLE II
Regualtion with dichloroethylene, polymerization at 75° C., H$_2$O/VF ratio=4

| Example | AIBA·HCl (catalyst) (percent) | Dichloroethylene (percent) | Reaction time (min.) | Conversion (percent) | K-value (120° C.) cyclohexanone | $\Delta$K | Vicat number (° C.) | V/K |
|---|---|---|---|---|---|---|---|---|
| 1 | 0.15 | | 150 | 90 | 94 | | 115 | 1.2 |
| 2 | 0.15 | 0.05 | 210 | 98 | 77 | 17 | 108 | 1.4 |
| 3 | 0.15 | 0.1 | 180 | 88 | 68 | 26 | 110 | 1.6 |
| 4 | 0.1 | 0.1 | 210 | 87 | 70 | 24 | 110 | 1.6 |
| 5 | 0.15 | 0.15 | 210 | 81 | 57 | 37 | 115 | 2.0 |
| 6 | 0.15 | 0.2 | 250 | 86 | 48 | 46 | 110 | 2.3 |

EXAMPLE 7

An autoclave similar to that described in Example 1 was used in this run. There were introduced into the autoclave 1500 ml. water, 0.4 g. potassium persulfate and 200 g. vinyl fluoride. Again as in Example 1, the polymerization was carried out under stirring at a temperature of 75° C. The initial pressure of 90 kp./cm.$^2$ dropped to 30 kp./cm.$^2$ after 5 hours. Following opening of the autoclave, the PVF obtained which was present in the form of a suspension was treated with methanol, separated off with suction, and washed in a water/methanol mixture. The washed polymer was then dried at 70° C. using vacuum in the final stage. The yield amounted to 168 g. (84%).

EXAMPLE 8

The procedure of Example 7 was repeated but in this instance 0.6 g. dichloroethylene was added. The yield of polyvinyl fluoride amounted to 164 g. (82%).

preparation obtained without dichloroethylene and a preparation obtained using 0.2% dichloroethylene. The measurements are based on weight losses of 0.2%, 1%, 5% and 10%.

TABLE IV
PVF prepared using azo-bis-isobutyramidine hydrochloride as a catalyst—thermogravimetric analysis (Mettler thermoanalyzer)

| | Weight loss at ° C., approx. | | | |
|---|---|---|---|---|
| Sample | 0.2% | 1% | 5% | 10% |
| PVF prepared without dichloroethylene | 300 | 335 | 385 | 400 |
| PVF prepared by adding dichloroethylene (0.2%) | 310 | 350 | 390 | 410 |

We claim:
1. Process for preparing polyvinyl fluoride which comprises polymerizing vinyl fluoride at a temperature range between the critical temperature of vinyl fluoride and

TABLE IIa
Regulation with dichloroethylene, polymerization at 75° C., H$_2$O/VF ratio=7.5

| Example | K$_2$S$_2$O$_8$ (catalyst) (percent) | Dichloroethylene (percent) | Reaction time (min.) | Conversion (percent) | K-value 120° C. cyclohexanone | $\Delta$K | Vicat number (° C.) | V/K |
|---|---|---|---|---|---|---|---|---|
| 7 | 0.2 | | 300 | 84 | 115 | | 114 | 1.0 |
| 8 | 0.2 | 0.3 | 300 | 82 | 49 | 66 | 110 | 2.2 |

Another advantage of the VF polymerizates prepared by the process of the invention, preferably using as polymerization initiators a hydrochloride of a substituted or unsubstituted azo-bis-isobutyramidine (the latter are known catalysts for VF polymerization) is an improved thermostability. In particular, the phenomenon of the yellow coloration observed in the vinyl fluoride polymerization obtained by an unregulated polymerization upon 130° C. in the aqueous phase in the presence of a water-soluble catalyst and of 0.05 to 0.5 wt. percent of trans-1,2-dichloroethylene based on vinyl fluoride.

2. Process according to claim 1 wherein said catalyst is a member selected from the group consisting of azo-bis-isobutyramidine-hydrochloride, the N-alkyl-substitution derivatives thereof and the alkali metal salts of persulfuric acid.

3. Process according to claim 1 wherein said catalyst is azo-bis-isobutyramidine-hydrochloride.

4. Process according to claim 1 wherein said catalyst is potassium persulfate.

5. Process according to claim 1 wherein said polymerization is carried out at a temperature range from 60° C. to 100° C.

6. Process according to claim 1 wherein said polymerization is carried out at a temperature of about 75° C.

7. Process according to claim 1 wherein said polymerization is carried out in the presence of 0.05 to 0.3 wt. percent of trans-1,2-dichloroethylene based on vinyl fluoride.

References Cited

UNITED STATES PATENTS

| | | | |
|---|---|---|---|
| 2,419,008 | 4/1947 | Coffman et al. | 260—92.1 |
| 2,599,300 | 6/1952 | Upson | 260—92.1 |
| 3,428,618 | 2/1969 | Cook et al. | 260—92.1 |

OTHER REFERENCES

Georgieff, Chem. Abs., 62 (1965), p. 2825d.
Pichler et al., Chem. Abs., 67 (1967), p. 73920t.

HARRY WONG, JR., Primary Examiner

U.S. Cl. X.R.

117—132; 260—92.8